United States Patent [19]

Snyder et al.

[11] Patent Number: 5,154,660

[45] Date of Patent: Oct. 13, 1992

[54] PET RESTRAINING APPARATUS

[75] Inventors: William A. Snyder, Sierra Vista; Mark L. Angier, Tucson; Anthony C. Mulligan, Tucson; Donald R. Uhlmann, Tucson, all of Ariz.

[73] Assignee: Pet Affairs, Inc., Tucson, Ariz.

[21] Appl. No.: 562,670

[22] Filed: Aug. 3, 1990

[51] Int. Cl.⁵ ..................... A01K 15/00; A01K 27/00
[52] U.S. Cl. ........................................ 119/96; 119/109
[58] Field of Search ................. 119/96, 109; 24/168, 24/171, 625, 633, 616, 181, 170

[56] References Cited

U.S. PATENT DOCUMENTS

| | | | |
|---|---|---|---|
| 263,636 | 3/1982 | Bassani | D30/04 |
| D. 293,139 | 12/1987 | Roa | D30/152 |
| 1,508,601 | 9/1924 | Huff | 119/96 |
| 1,685,435 | 9/1928 | Philbrick | 119/96 |
| 1,697,363 | 1/1929 | Lasey | 119/96 |
| 1,906,043 | 4/1933 | Bernstein | 119/96 |
| 2,026,383 | 12/1935 | Gyulay | 119/96 |
| 2,132,556 | 10/1938 | Blackshaw | 119/96 |
| 2,187,021 | 3/1967 | Everson | 119/96 |
| 2,212,746 | 8/1940 | Nunn | 119/96 |
| 2,670,712 | 3/1954 | Patience et al. | 119/96 |
| 2,909,154 | 10/1959 | Thomas | 119/96 |
| 2,996,228 | 8/1961 | Bauman | 119/96 X |
| 3,310,034 | 3/1967 | Dishurt | 119/96 |
| 3,480,325 | 11/1969 | Kramer | 24/170 |
| 3,510,151 | 5/1970 | Weman | 24/170 |
| 3,768,445 | 10/1973 | Sorrels | 119/109 |
| 3,948,222 | 4/1976 | Longshore et al. | 119/96 |
| 4,026,245 | 5/1977 | Arthur | 119/96 |
| 4,035,877 | 7/1977 | Brownson et al. | 24/633 |
| 4,150,464 | 4/1979 | Tracy | 24/77 |
| 4,171,555 | 10/1979 | Bakker et al. | 24/200 |
| 4,252,084 | 2/1981 | Willow | 119/96 |
| 4,273,215 | 6/1981 | Laggerta | 119/96 |
| 4,537,154 | 8/1985 | Kay | 119/96 |
| 4,597,359 | 7/1986 | Moorman | 119/96 |
| 4,676,198 | 6/1987 | Murray | 119/96 |
| 4,712,280 | 12/1987 | Fildan | 24/625 |
| 4,715,618 | 12/1987 | Harris | 280/801 |
| 4,759,311 | 7/1988 | Boyle | 119/96 |
| 4,817,562 | 4/1989 | Giroux | 119/96 |
| 4,825,515 | 5/1989 | Wolterstorff | 214/625 |
| 4,831,694 | 5/1989 | Kong | 24/625 |
| 4,879,972 | 11/1989 | Crowe et al. | 119/109 |
| 4,896,630 | 1/1990 | Lucis | 119/96 |
| 4,907,541 | 3/1990 | Thompson | 119/96 |
| 4,932,362 | 6/1990 | Birchmann, III et al. | 119/96 |

FOREIGN PATENT DOCUMENTS 1174917 9/1984 Canada .

OTHER PUBLICATIONS

PSM, vol. 43, No. 4, Apr. 1989.
How Safe Is your Pet?, Coyote ® Pet Products, Inc., Chula Vista, Calif.
Test Drive An "Easy Rider" Car Harness, Safari by Whitco, Centerreach, N.Y.

*Primary Examiner*—Paul J. Hirsch
*Attorney, Agent, or Firm*—Fitzpatrick, Cella, Harper & Scinto

[57] ABSTRACT

A harness and restraining system for transporting an animal comfortably and safely in a vehicle. The harness comprises forward and rearward loops connected together by connecting portions and a pair of quick release fastener elements on the harness to accept one end of a leash and a restraining strap. The restraining strap is constructed to be attached to a standard automobile seat belt system.

38 Claims, 6 Drawing Sheets

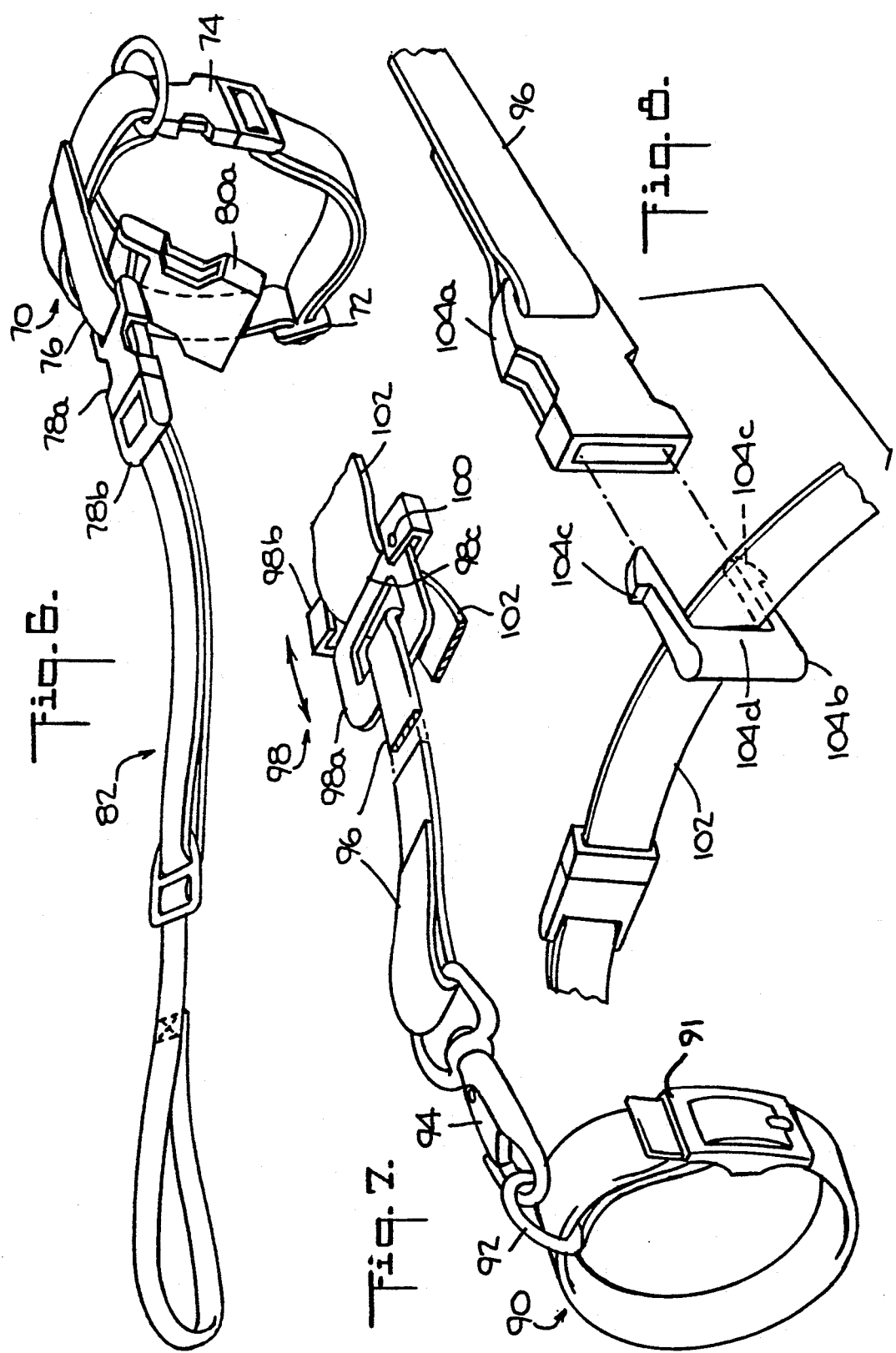

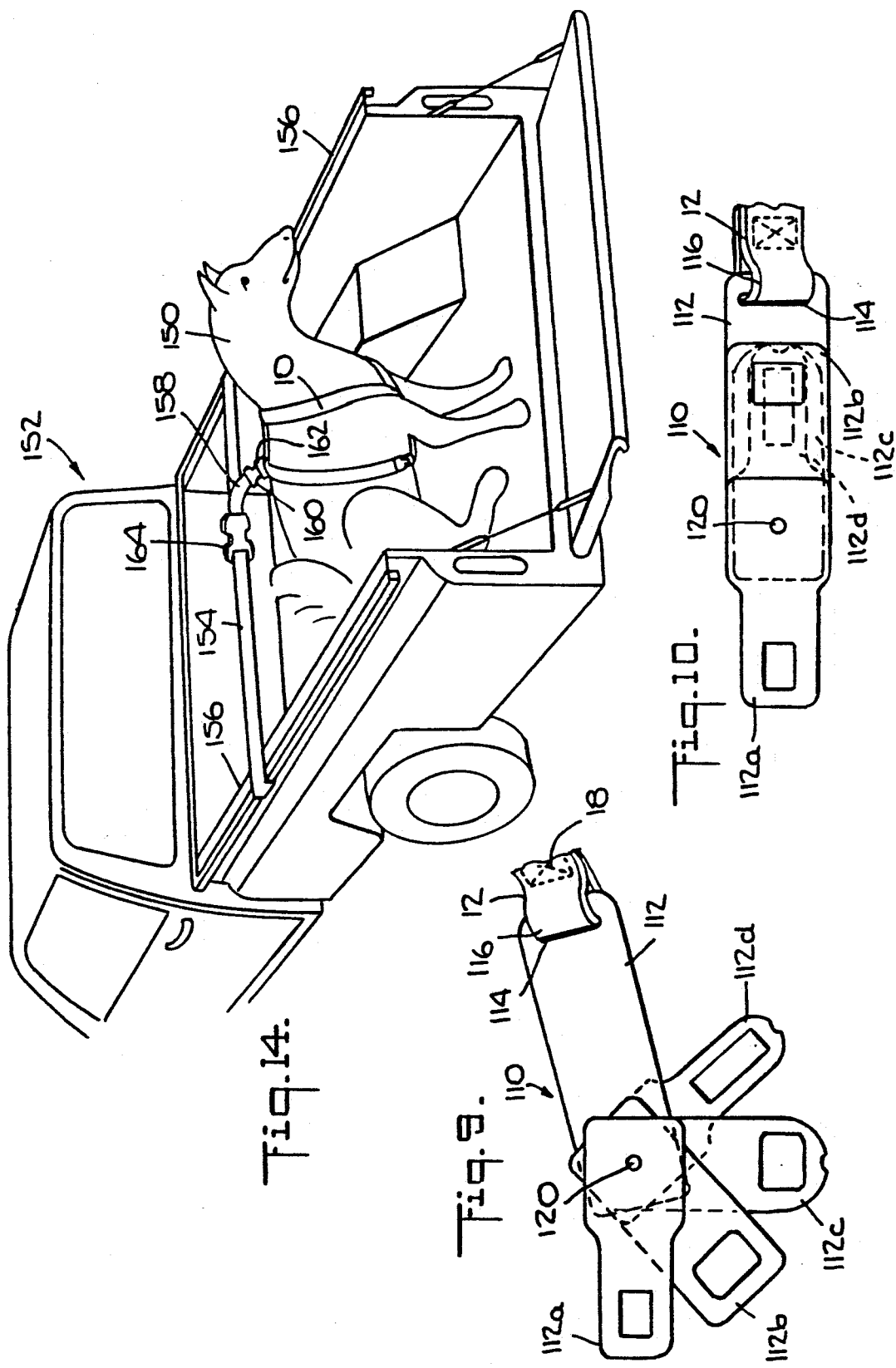

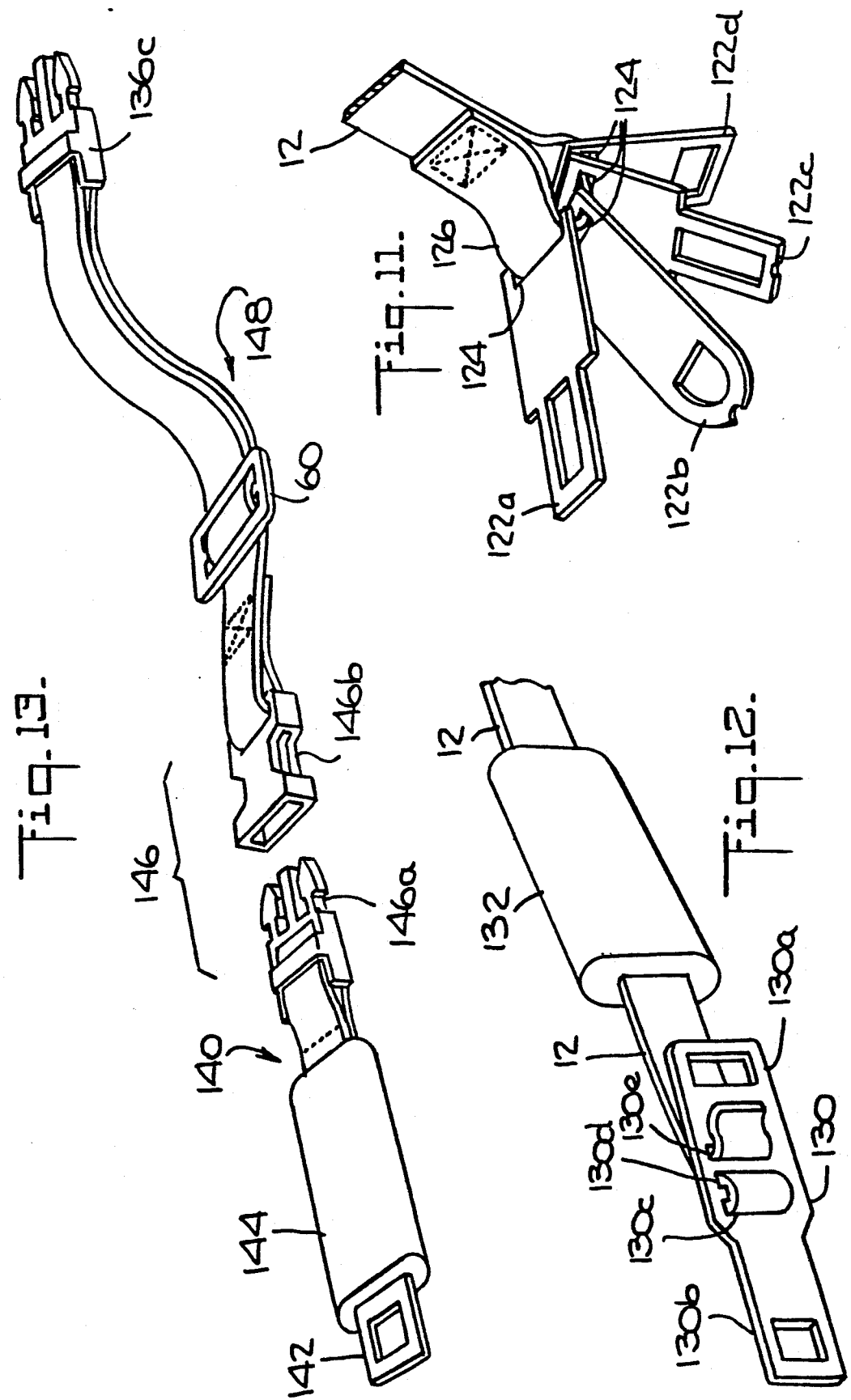

PET RESTRAINING APPARATUS

BACKGROUND OF THE INVENTION

1. Field of the Invention

This invention relates to animal restraining devices and more particularly it concerns novel safety restraints for comfortably and safely securing pets in automobiles and other vehicles.

2. Description of the Prior Art

As evidenced by a large number of patents relating to animal restraining devices for use in vehicles, there is a recognized need for such a device that is simple in construction, convenient to use and safe and comfortable for the animal being restrained.

U.S. Pat. No. 4,817,562 and Canadian Patent No. 1,174,917 disclose vehicle restraints for pets which comprise a harness with straps extending therefrom and latching members or tangs on the ends of the straps for engaging seat belt buckles or buckle inserts found on the ends of conventional automobile seats. The restraint disclosed in U.S. Pat. No. 4,817,562, however, is permanently attached to a harness which is worn by the animal and thus requires special manipulation when the animal is released from the vehicle. Further, the restraint system disclosed in U.S. Pat. No. 4,817,562 requires two connections to latching members on the car; and since it requires connection to both the male end and the female latching member of the seat belt mechanism of the car, it is not useable in seats, such as the front seat of most cars, where one end of the seat belt mechanism is movable. The restraint shown in Canadian Patent No. 1,174,917 is connected to the harness via a leash and the free end of the leash is a potential source of discomfort or harm to the animal being restrained. In addition the device shown in the Canadian patent does not provide continuous adjustability in length of connection between the animal and the latching member or adjustability of the harness itself.

U.S. Pat. No. 3,310,034, U.S. Pat. No. 3,948,222 and U.S. Pat. No. 4,715,618 disclose vehicle restraints for pets which comprise a harness and a strap or chain which is attached to the vehicle and is releasably connected to the harness. The straps shown in U.S. Pat. No. 3,310,034 and the chain shown in U.S. Pat. No. 3,948,222 are both permanently attached to the vehicle and thus present a problem of storage when the vehicle is not being used to transport the animal. Also, the restraint systems of these patents can be used only in vehicles which have been specially provided with these straps or chains. The straps shown in U.S. Pat. No. 4,715,618 are adjustable in length and detachable from the harness and from eyebolts on the vehicle; however, here also the vehicle must be specially outfitted with such means for attaching the straps to the vehicle. Further, the restraint system shown in U.S. Pat. No. 4,715,618 requires two fixed points of connection to both the animal and the vehicle and thus presents difficulty in attaching the harness assembly.

U.S. Pat. No. 4,676,198 shows an animal restraint apparatus wherein a tether or leash is folded into a loop and attached to a harness for storage such that the loop can accommodate a vehicle seat belt to restrain the animal. Such apparatus, however, requires the animal to carry the leash or tether on the harness while being restrained in the vehicle. There is a possibility that the free end of the tether or leash could come loose and cause discomfort or possible harm to the animal. Also, the arrangement for connecting to a vehicle seat belt does not permit precise and fixed length adjustment of the restraint. The restraint system shown in U.S. Pat. No. 4,676,198 when used with an automobile shoulder strap seat belt system does not provide adequate safe restraint in that it may allow the animal to interfere with the driver because of a lack of fixed restraint. Further, when the restraint system is used with a lap type seat belt system, the animal is constrained to an upright sitting position which can be uncomfortable for an animal over extended periods of time.

In addition, U.S. Pat. No. 4,597,359 shows an animal restraint system in the form of a platform which is secured by an automobile seat belt to the seat of an automobile and which has an adjustable length lead portion that can be connected to the animals harness. This restraint system is complicated and presents a problem of storage when the animal is not being carried in the vehicle.

It is also noted that the prior art vehicle restraint systems do not secure the animal in a manner which is both comfortable and safe. For example, the restraints shown in U.S. Pat. No. 3,310,034, U.S. Pat. No. 4,715,618 and U.S. Pat. No. 4,817,562 hold the animal from both sides in a manner that affords very limited movement and can become uncomfortable to the animal after a period of time. The restraints shown in U.S. Pat. No. 3,948,222 and U.S. Pat. No. 4,597,359 have single point strap or chain to harness connections which permit greater movement; however, because of the extent of allowable movement and/or the connection arrangement, the animal may be pulled over in a dangerous manner if the vehicle should stop suddenly. The attachment shown in Canadian Patent No. 1,174,917 is less likely to pull the animal over dangerously but, as pointed out above, the free end of the leash, through which the harness is connected to an automobile seat belt, is a source of danger and discomfort both to the animal and to other passengers in the vehicle.

SUMMARY OF THE INVENTION

According to one aspect of the invention, there is provided a novel animal restraining harness for securely and safely restraining an animal in a vehicle. This novel harness comprises forward and rearward loops which can be fitted, respectively, around the neck of an animal forwardly of its front legs and around the body of the animal rearwardly of its front legs. The lower portion of the forward loop extends down between the front legs of the animal and is connected via a lower connecting portion to the rearward loop. The upper portion of the forward loop is connected to the upper portion of the rearward loop via an upper connecting portion extending along the back of the animal. A releasable fastener element is located on the harness and is configured to receive a restraining strap which is attached to a location inside a carrying compartment of the vehicle, e.g. the passenger space or, in the case of a truck, the cargo area as well.

According to a further aspect of the invention there is provided a novel pet restraining apparatus for securely and safely restraining an animal in a vehicle. This novel restraining apparatus comprises a harness configured to be fitted around an animal to be restrained, a first quick release fastener element secured to the harness and a restraining strap. The restraining strap has a quick release fastener portion at one end which is lockable with a standard automobile seat belt system. The other end of the restraining strap has a second quick release fastener element which can be quickly and securely attached to the first quick release fastener element on the harness. The restraining strap is adjustable in length.

According to a still further aspect of the invention, there is provided a novel pet restraining apparatus which is simple in construction yet is easily adaptable for use with different size pets to restrain them safely using a standard automobile seat belt buckle system. The novel pet restraining apparatus according to this aspect of the invention comprises a harness which is configured to be fitted around an animal to be restrained, and a restraining strap. The harness has secured thereto a first quick release fastener element. The restraining strap has securely affixed to one end thereof a quick release buckle portion which mates with and locks to one part of the buckle portion of a standard automobile seat belt system. The other end of the restraining strap has a second quick release fastener element which can be quickly and securely attached to the harness, either directly or via an intermediate restraining strap extension.

According to yet another aspect of the invention there is provided a novel pet restraining apparatus for securely and safely restraining an animal in the cargo area of a truck. This novel restraining apparatus comprises a harness configured to be fitted around an animal to be restrained, a first quick release fastener element secured to the harness and a restraining strap. The restraining strap has securely affixed thereto a quick release clamp which is constructed to clamp onto a cargo strap extending through the cargo area of a truck. The other end of the restraining strap has a second quick release fastener element which can be quickly and securely attached to the first quick release fastener element on the harness.

BRIEF DESCRIPTION OF THE DRAWINGS

FIG. 6 is a perspective view showing a second embodiment of the pet restraining apparatus of the present invention, in which a collar is provided for the animal being restrained;

FIG. 7 is a perspective view, partially cut away, showing the second embodiment with a modified collar and an alternate form of connection to an automobile seat belt system;

FIG. 8 is a fragmentary perspective view of a portion of a restraining strap used in the present invention, with a still further form of connection to an automobile seat belt system;

FIG. 9 is a plan view, showing in open array, a further form of universal buckle insert construction that may be used in connection with the restraining strap and/or leash of the present invention;

FIG. 10 is a view similar to FIG. 9, showing the universal buckle insert construction of FIG. 9 in its operating configuration;

FIG. 11 is a perspective view showing another form of universal buckle insert construction that may be used in connection with the restraining strap and/or leash of the present invention;

FIG. 12 is a perspective view showing a still further form of universal buckle insert construction with alternative arrangement for connecting same to the webbing of a restraining strap and/or leash according to the present invention;

FIG. 13 is a perspective view of a restraining strap and restraining strap extension assembly which may be used as part of the pet restraining apparatus of FIGS. 1-4 and 6; and FIG. 14 is a perspective view showing another embodiment of the present invention used to restrain a pet in an open cargo area of a truck.

DETAILED DESCRIPTION OF THE PREFERRED EMBODIMENTS

Figure 1:
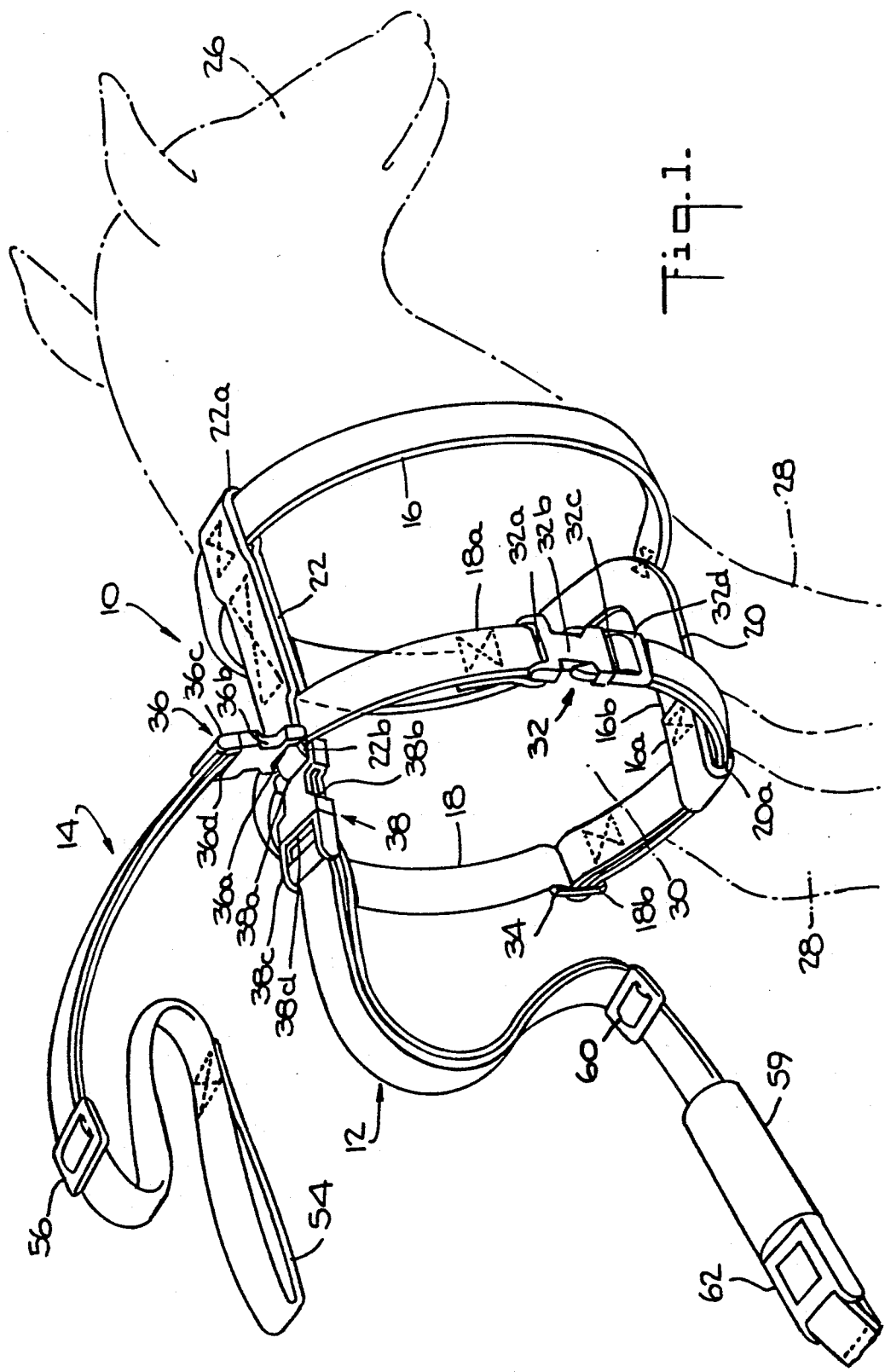
FIG. 1 is a perspective view of a pet restraining apparatus according to the present invention and shown with a restraining strap and leash connected to a harness.
Figure 2:
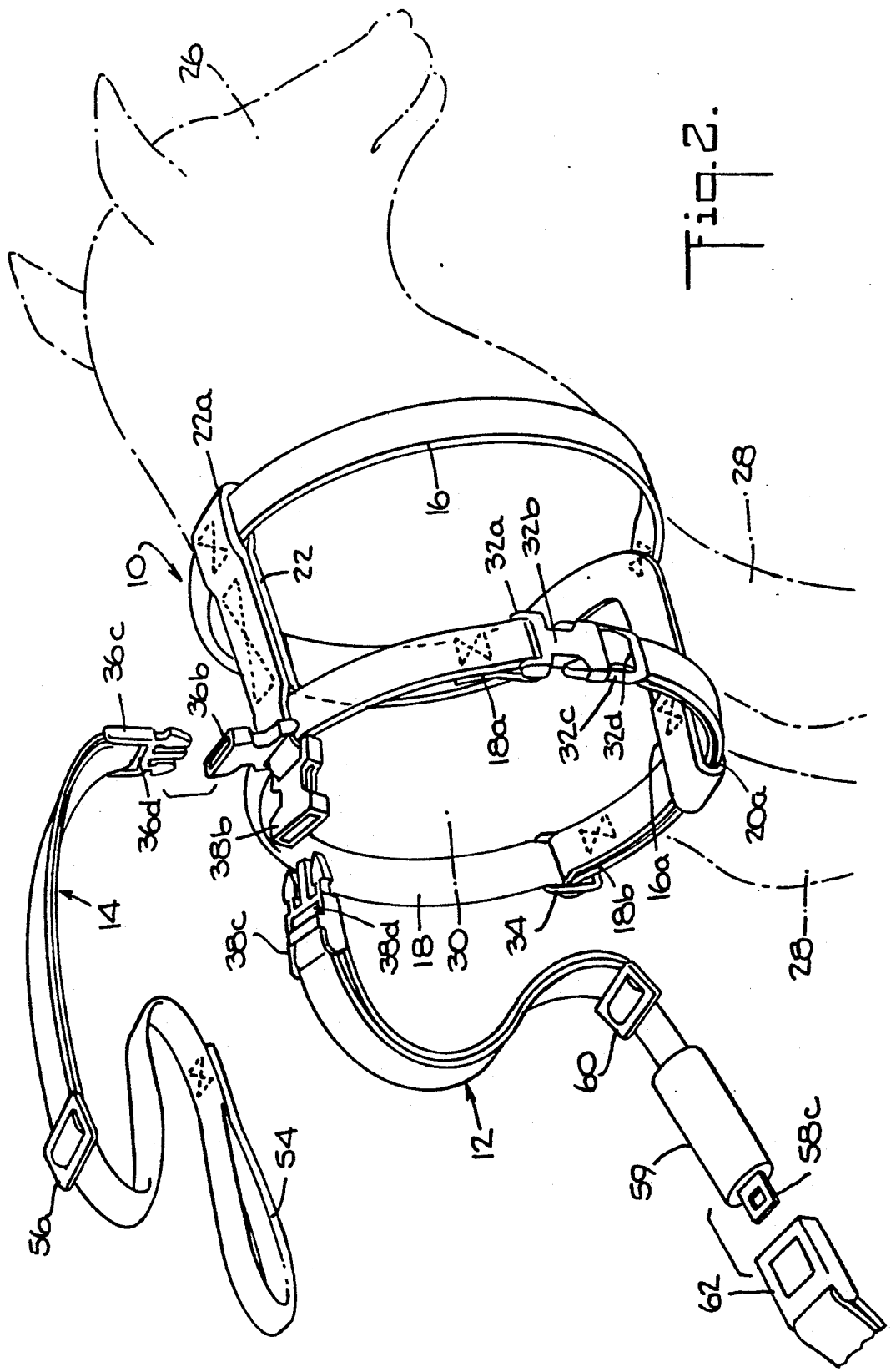
FIG. 2 is a view similar to FIG. 1 but showing the restraining strap and leash disconnected from the harness.

As shown in FIGS. 1 and 2, a pet restraining apparatus according to the present invention comprises a harness 10, a restraining strap 12 and a leash 14. Each of these elements is made up of strapping or webbing material such as, cotton, polyester, polypropylene, etc., which is flexible yet strong and light in weight. Material used in conventional automobile seat belts is preferred. The strapping or webbing material in the illustrated embodiment is about one inch (2.54 cm) wide, since this width provides adequate strength and minimum discomfort to the animal. Also, one inch (2.54 cm) webbing is readily available and it fits with standard quick release fasteners described herein. However, other widths may be provided depending on the size of the animal being restrained. Typical widths would range from ⅝ inch (1.6 cm) to 1½ inches (3.8 cm) which will accommodate most pets.

The harness 10 is formed as a forward loop 16, a rearward loop 18, a lower connecting portion 20 and an upper connecting portion 22. As shown, the forward loop 16 fits around the neck 24 of an animal, such as a dog 26, and extends down between the animal's front legs 28. The rearward loop 18 fits around the animal's body 30 behind its front legs. The lower connecting portion 20 is formed by securing together the ends of the forward loop 16, for example, by sewing. One of the ends, 16a is longer than the other 16b and is formed behind the loop 16 into a subloop 20a. The longer end 16a is then sewn or otherwise secured back onto the other end 16b. The rearward loop 18 passes through the subloop 20a and is free to move longitudinally through the subloop. The upper connecting portion 22 extends along the back of the animal. The strapping or webbing material of the upper connecting portion is folded back on itself at its forward and rearward ends to form a forward subloop 22a and a rearward subloop 22b and is sewn or otherwise secured together between these subloops. The forward loop 16 of the harness passes through the forward subloop 22a and is sewn or otherwise secured in place to the subloop at a location opposite the lower connecting portion 20. The rearward subloop 22b accommodates the rearward loop 18 in a manner which allows it to move freely through the subloop. The harness strapping or webbing material may also be secured together by various means other than sewing, for example by adhesive, heat bonding or by mechanical means such as rivets.

In order to permit the harness 10 to be secured to the animal quickly and with a minimum of difficulty, the rearward loop 18 is provided with a quick release buckle 32. When the buckle 32 is released, the loop 18 is opened with one buckle portion at each open end of the loop. Thus, the harness can be secured to the animal by placing the forward loop 16 over the head of the animal and putting one leg through the opening between the loops 16 and 18 and the lower and upper connecting portions 20 and 22. The rearward loop 18 is then brought around the body of the animal and closed by connecting the mating portions of the buckle 32 together.

One open end 18a of the loop 18 extends through an opening 32a of a receptacle portion 32b of the quick release buckle 32 and is sewn or otherwise secured back against itself. The other open end 18b of the loop 18 extends around the center bar of a conventional length adjustment means such as a slide or ladder lock 34 and is likewise sewn or otherwise secured back against itself. First, however, the material of the loop 18 passes between the center bar and each outer bar of the length adjustment means such as the slide 34 and through an opening 32c of an insert portion 32d of the quick release buckle 32. Thus the rearward loop 18 not only may be opened to permit mounting of the harness on an animal but the size of the loop may be adjusted by moving the slide 34 along the length of the loop.

The precise construction of the quick release buckle 32 is not critical to the invention except that it should be strong and reliable, yet light in weight and small enough not to be interfered with by or cause discomfort to the animal being restrained. Preferably it is made of high strength plastic. A suitable buckle construction is shown and described in U.S. Pat. No. 4,150,464 and U.S. Pat. No. 4,171,555. Snap fasteners may also be used.

The rear subloop 22b of the upper connecting portion 22 also passes through openings 36a and 38a of receptacle portions 36b and 38b, respectively, of leash and restraint quick release buckles 36 and 38. These receptacle portions are thus held securely to the rear of the upper connecting portion 22 but are free to pivot up and down relative to the connecting portion. The construction of the quick release buckles 36 and 38 may be the same as that of the quick release buckle 32 on the rearward loop 18. The quick release buckle 36 includes an insert portion 36c which is connected to one end of the leash 14. Likewise the quick release buckle 38 includes an insert portion 38c, which is connected to one end of a restraining strap 12. Each of the leash 14 and the restraining strap 12 can be separately and independently connected to and disconnected from the harness 10 via their respective quick release buckles 36 and 38. It will be appreciated that either or both the insert portions 36c and 38c of the quick release buckles 36 and 38 could be on the harness 10, in which case the respective mating receptacle portion 36b and/or 38b would be on the leash 14 or the restraining strap 12.

The leash 14 is preferably formed of the same webbing or strapping material as the harness 10. The end of the leash 14 remote from the quick release buckle 36 is looped over and sewn or otherwise attached against itself to form a handgrip loop 54. The other end of the leash 14 extends through a conventional length adjustment means such as around the center bar of a length adjustment slide 56 and is attached back against itself. First, however, the material of the leash 14 passes between the center bar and each of the outer bars of the slide 56 and through an opening 36d of the portion 36c of the quick release buckle 36. Thus the leash 14 not only may be securely connected to and easily disconnected from the harness 10; and in addition, by movement of the length adjusting means such as the slide 56, the length of the leash may be adjusted.

The restraining strap 12 is preferably also formed of the same webbing or strapping material as the harness 10. The end of the restraining strap 12 remote from the quick release buckle 38 is looped through openings 58a (FIG. 5) in the center of a universal seat belt buckle insert 58 and is attached back against itself. The other end of the restraining strap 12 extends around the center bar of a further length adjustment slide 60 and is also attached back against itself. First, however, the material of the restraining strap 12 passes between the center bar and the outer bars of the length adjustment means such as the slide 60 and through an opening 38d of the insert portion of the quick release buckle 38. Thus the restraining strap 12 may be securely connected to and easily disconnected from the harness 10; and in addition, by movement of the slide 60, the length of the restraining strap may be adjusted. It will be appreciated that alternative slide type length adjusting means may be used in place of the type shown.

Figure 5:
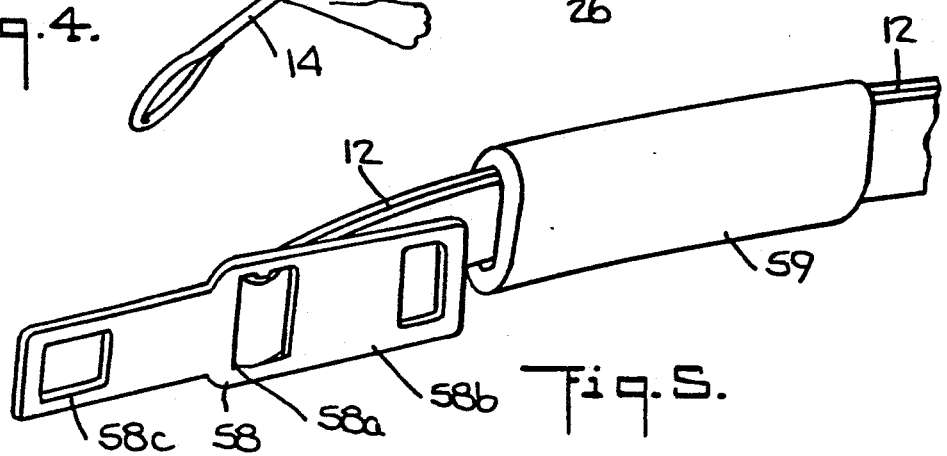
FIG. 5 is a fragmentary perspective view showing a buckle insert used with the restraining strap and leash of FIGS. 1 and 2.

The universal seat belt buckle insert 58, as shown in FIG. 5 is formed with a wide end 58b and a narrow end 58c which can be accommodated, respectively, into the receptacle portion of different type automobile seat belt buckles. As can be seen, either end of the insert 58 may be made to extend from the end of the restraining strap 12. In order to hold the insert in position so that the proper end extends from the strap 12, a sleeve 59, preferably of foam rubber or similar material, is snugly fitted over the strap and over the portion of the insert 58 which extends back along the strap. This sleeve covers the portion of the insert which extends out of the vehicle seat belt receptacle and protects both the vehicle, the passengers and the animal being restrained from injury.

Figure 3:
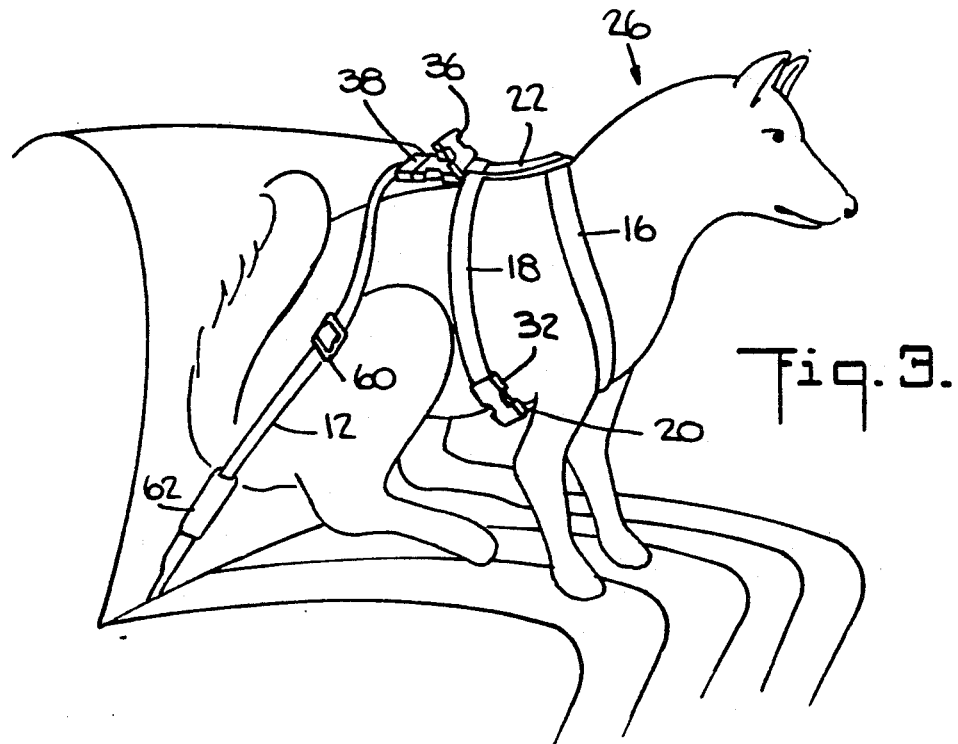
FIG. 3 is a perspective view of an animal restrained in a vehicle by means of the restraining apparatus of FIG. 1.
Figure 4:
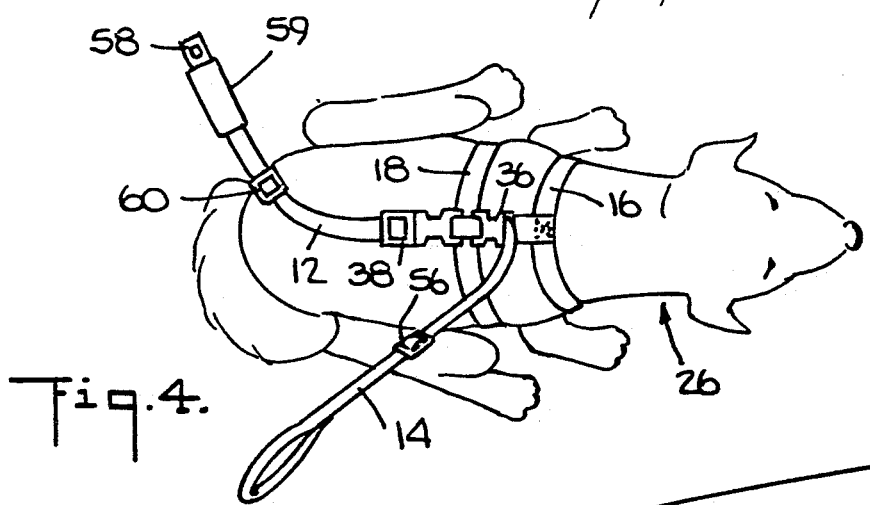
FIG. 4 is a top view of the animal of FIG. 3.

In use of the described restraining apparatus, the harness 10 is first secured to the pet 26, as above described and as shown in FIGS. 3 and 4. The leash 14 is then adjusted to a length suitable for walking the pet by moving the slide 56 to the proper position along the leash. The buckle insert portion 36c on the end of the leash is then inserted into the receptacle portion 36b of the quick release buckle 36. The pet may then be walked in the normal manner.

When the pet is brought to an automobile or other vehicle in which it is to be transported, the restraining strap 12 is secured to the vehicle by inserting its seat belt buckle insert 58 into the receptacle portion of one of the vehicle's seat belt buckles 62 (FIGS. 2 and 3). As indicated above, since the buckle insert element 58 can be moved relative to the restraining strap so that either its wider end 58b or its narrower end 58c projects from the end of the restraining strap, the strap can be fastened to different types of seat belt buckles.

It should be noted that the seat belt buckle insert 58 could be replaced by a seat belt buckle receptacle portion to connect with the insert portion of one of the vehicle's seat belt buckles. However, it is generally preferred that the connector element 58 be of the insert type to connect with the receptacle portion of the vehicle's seat belt system. This is because the receptacle portion of most automotive seat belt buckles is fixed in the vehicle while the insert portion is attached to an adjustable length part of the seat belt system. For restraining a pet, it is preferred that the pet not be attached to an adjustable length part of the vehicle's seat belt system. This is because gradual force will usually extend the adjustable length part and in many seat belt systems the adjustable length part will not thereafter retract unless it is given a quick tug. Therefore, for reliable animal restraint, it is preferred that the length of the strap not be adjustable by any pulling force once the animal is secured in position.

Once the restraining strap 12 is connected to the vehicle seat belt buckle 62, the slide 60 is moved to adjust the strap to a proper length for the animal to be restrained. The animal wearing the harness 10 is then put into the vehicle and the insert portion 36c of the quick release buckle 36 on the strap 12 is inserted into the receptacle portion 36b on the harness 10. With the animal thus securely in place in the vehicle, the leash 14 may be removed by releasing the quick release buckle 38. The animal is thus held at a fixed distance from the vehicle seat belt buckle 62 so that it has some freedom of movement. However, if the vehicle should stop suddenly, the animal will not be jerked in a dangerous and harmful manner. Further, because of the design of the harness 10 and the location where the restraining strap 12 is connected to the harness, the restraining force on the animal is not likely to pull the animal over or around. In this connection, it will be noted that because the forward loop 16 extends down between the front legs of the animal the harness is prevented from rotating about its body and the connection of the leash 14 and the restraining strap 12 to the harness is always maintained directly on the back of the animal.

It will also be appreciated that when the animal is to be taken from the vehicle, the leash 14 may be connected in place before the restraining strap 12 is released. Thus the animal is at all times under the control of its owner or custodian. Further, when the animal is taken from the vehicle, the restraining strap 12 may be removed with ease and conveniently stored or carried.

FIG. 6 shows an alternate embodiment which can be employed for small animals, in which a simple collar 70 replaces the harness 10 of the first embodiment. The collar 70 is made of webbing as in the previous embodiment and it includes a length adjustment means such as a slide 72 and a quick release buckle 74 so that it can be put on an animal to be restrained and adjusted to size.

A loop 76 of webbing material is formed on the collar 70 and accommodates the portions 78a and 80a of quick release fasteners which are connected, respectively, to a leash 82 and a restraining strap (not shown). As can be seen, the leash 82 is of the same construction as the leash 14 of the first embodiment. The restraining strap (not shown) also may be of the same construction as the strap 12 of the first embodiment.

FIG. 7 shows a further modification wherein a collar 90 is formed with a conventional buckle 91 which both opens the collar and permits it to be adjusted in length by increments. The collar 90 is also provided with a D-ring 92 to which a snap fastener 94 may be attached. The snap fastener 94 is connected to a restraining strap 96 of similar construction to the restraining strap 12 of the first embodiment. Thus the strap 96 is provided with a length adjustment means (not shown) which may be similar in construction to the length adjustment means such as the slide 60 in the first embodiment. In addition a leash (not shown), of similar construction to the leash 10 of the first embodiment, may be provided in the embodiment of FIG. 7. In this case, however, the leash may have a snap fastener similar to the snap fastener 94 and both fasteners may be attached to the D-ring 92 together or separately.

The embodiment of FIG. 7 is also shown with an alternate means for securing the restraining strap 96 to a vehicle seat belt system. As shown in FIG. 7, the end of the strap 96 is secured to a stationary portion 98a of a strap clamp assembly 98. The stationary portion 98a is in the form of a flat rigid plate-like element. The clamp assembly 98 also includes a movable portion 98b which is connected at a pivot 100 near one edge, to the stationary portion 98a. When the movable portion 98b is pivoted away from the stationary portion 98a, as shown in FIG. 7, the webbing 102 of an automobile seat belt system may be inserted between an edge 98c of the stationary portion 98a and the movable portion 98b. The movable portion 98b is then pivoted to close on the stationary portion and press the webbing 102 between itself and the edge 98c of the stationary portion. Any suitable latching means (not shown) may be used to hold the movable portion 98b tightly against the stationary portion 98a with the automobile seat belt webbing 102 held tightly therebetween.

FIG. 8 shows a still further arrangement for securing the restraining strap 96 to a vehicle seat belt system. In this embodiment the restraining strap 96 is connected to a first clamping portion 104a of a quick release fastener. This first portion may be of the same construction as the corresponding portion of the quick release fasteners 32, 36 and 38 of the first embodiment. In this embodiment there is also provided an insert portion 104b which contains resilient barbed arms 104c, to fit into and latch in the first clamping portion 104a as in the first embodiment. In this embodiment, however, the clamping portion 104b has a clamping base 104d between the arms 104c; and when the insert portion is snapped in place in the receptacle portion, the base 104a is held close to the receptacle portion. As shown in FIG. 8, the insert portion 104b is placed around the webbing 102 or cord of an automotive seat belt system so that the webbing rests against the clamping base 104d and the arms 104c extend past opposite edges of the webbing. Then the insert portion 104b is snapped into the clamping portion 104a and the webbing 102 is clamped securely between the insert and receptacle portions.

It will be appreciated that the clamping arrangements of FIGS. 7 and 8 may be used on the restraining strap 14 of the first embodiment and, of course, the buckle insert element 58 of the first embodiment may be used on the restraining strap 96 of the embodiments of FIGS. 7 and 8.

FIGS. 9 and 10 show the construction of a universal seat belt buckle insert assembly 110 which may be used to attach the restraining strap 12 to any of several different size automobile seat belt buckle receptacles. As shown, the assembly 110 comprises a main plate 112 having a slot 114 formed near one end to accommodate a loop 116 at the end of the restraining strap 12. The loop 116 is sewed or otherwise secured to itself, as shown at 118, to hold the restraining strap to the plate 112. A plurality of plate-like insert elements 112a, 112b, 112c and 112d are arranged in stacked array; and a common pivot pin or rivet 120 connects one end of each of the insert elements to the main plate 112 near the end thereof opposite the slot 114. The opposite end of each of the insert elements 112a, 112b, 112c and 112d is shaped to fit into a different type or size seat belt buckle receptacle. The insert elements themselves can pivot around the common pivot or rivet 120 so that all but one of them (e.g. element 112a) extend back along the length of the plate 112 while the one element 112a projects out beyond the end of the plate as shown in FIG. 10 so that it can be inserted into the receptacle portion of an automobile seat belt buckle. If the apparatus is to be used in a vehicle which has a different size or type of seat belt buckle, the insert element 122a is pivoted back along the main plate 112 and one of the other insert elements 122b, 122c or 122d which fits with the different size or type of seat belt buckle is swung around the pin or rivet 120 to project out from the end of the main plate 112. If desired, a sleeve (not shown) similar to the sleeve 59 of FIG. 5 may be provided to hold in place the insert elements which are swung back along the plate.

In the arrangement of FIG. 11 a plurality of platelike insert elements 122a, 122b, 122c and 122d are formed with slots 124 near one end thereof; and a loop 126 of webbing from the restraining strap 12 passes through the slots 124 of each plate and is sewed or otherwise fastened to itself. The opposite ends of the insert elements are formed with different sizes and/or shapes, as in the case of the embodiment of FIGS. 9 and 10, to be fitted into different sizes or types of seat belt buckle receptacle portions. In use, only one of the elements 122a, 122b, 122c or 122d is projected out from the loop 126 and the other elements are extended back from the loop along the webbing of the restraining strap 12. Here too a sleeve, such as the sleeve 59 of FIG. 5, may be provided to extend over these latter elements to hold them in place.

In the arrangement of FIG. 12 a plate-like insert 130 is provided which is similar in construction and configuration to the insert 58 of FIG. 5 in that it has a wide end 130a and a narrow end 130b which can be accommodated, respectively, into the receptacle portion of different type automobile seat belt buckles. The insert 130 however differs in the manner of its attachment to the restraining strap 12. As can be seen in FIG. 12, the central portion of the insert 130 is formed with three closely spaced slots 130c, 130d and 130e. The end of the restraining strap 12 passes first through one of the outside slots, e.g., the slot 130c and then back through the central slot 130d and finally through the other outside slot 130e, as shown in FIG. 12.

As can be seen, there is no need to form a loop or to sew or otherwise secure the end of the restraining strap 12 back on itself. The interweaving of the strap through the three slots 130c, 130d and 130e has been found to be sufficient to hold the insert securely to the restraining strap even when the strap is suddenly jerked. Also it has been found that the insert 130 will be held securely to the strap irrespective of which of its ends 130a or 130b are projected outwardly from the strap.

A sleeve 132 which may be of the same construction as the sleeve 59 of FIG. 5 may also be provided to surround and hold the non-projecting end of the insert 130 back against the restraining strap 12. This enhances but is not necessary to maintain the connection between the insert and the restraining strap.

FIG. 13 shows a restraining strap and restraining strap extension assembly which may be used as part of the pet restraining apparatus of FIGS. 1-4 and 6. As shown in FIG. 13, there is provided a restraining strap 140 which is generally similar in construction to the strap 12 of FIGS. 1-5, except that it is shorter than the strap 12 and is not adjustable in length. At one end of the strap 140 there is securely affixed a seat belt buckle insert 142 which may be similar in construction to the insert 58 of FIG. 5 or the alternative arrangements of FIGS. 9-12. Also, a sleeve 144, similar to the sleeve 59 of the previous embodiments may be provided over the end of the strap 140 where the insert 142 is attached.

It should be understood that instead of the insert 142, a receptacle portion of a seat belt buckle assembly may be provided on the end of the restraining strap 140 to allow it to be locked to an insert portion of a seat belt buckle assembly in the vehicle.

At the opposite end of the restraining strap 140 there is securely affixed an insert portion 146a of a quick release buckle assembly 146.

It will be noted that the restraining strap 140 is shorter than the restraining strap 12 of the previous embodiments, and it is not adjustable in length.

There is also provided, in the arrangement of FIG. 13, an adjustable length restraining strap extension 148. This restraining strap extension is similar in construction to the restraining strap 12 of the previous embodiments, except that in place of the insert 58 of the preceding embodiments, there is provided a receptacle portion 146b of the quick release buckle assembly 146. It should be understood that while the quick release buckle assembly 146 in FIG. 13 is shown with the insert portion 146a on the restraining strap 140 and the receptacle portion 146b on the restraining strap extension 148, the buckle assembly may be reversed, with the receptacle portion 146b on the restraining strap 140 and the insert portion 146a on the restraining strap extension 148. The restraining strap extension 148 also has a quick release fastener portion 136c which locks to a mating portion on the harness 10 of FIGS. 1-4 or the collar 70 of FIG. 6 or the collar 90 of FIG. 7. Also, for length adjustment, the restraining strap extenstion 148 is provided with a slide 60 as in the embodiment of FIGS. 1-4.

The embodiment of FIG. 13 provides great flexibility in use. For example, where a small animal is to be secured in a vehicle, only the restraining strap 140 need be used; and it will be connected directly between the automobile seat belt buckle and the harness 10 of FIG. 1. In such case, the insert portion 146a on the strap 140 is connected directly to the quick release fastener receptacle portion 38b on the harness 10. Alternatively, a different type of quick release fastener arrangement, such as the snap fastener 94 and D-ring of FIG. 7, may be provided.

Where it is desired to use the restraining apparatus for larger animals, the restraining strap extension 148 may be interposed between the restraining strap 140 and the harness 10 (or the collar 70 in the case of the embodiment of FIG. 6). The extension 148 is adjustable in length so that it may be accommodated to animals of various size and may be adjusted to allow a desired amount of mobility for the animal consistent with safety.

FIG. 14 shows an arrangement for securing an animal such as a dog 150 in the cargo area of a light truck 152. As shown in FIG. 14 a cargo strap 154, which may be of a typical design, extends across and is attached to the upper edge of sidewalls 156 of the truck cargo area. Any well known means may be used to secure the cargo strap 154 to the sidewalls 156. For example, the strap may pass through slots formed in the sidewalls or it may be secured by means of anchors in the sidewalls.

A harness 10, as described in connection with FIGS. 1 and 2, is provided on the dog 150. Also a restraining strap 158 is provided with a quick release fastener element 160 on one end which can be quickly and easily attached to a mating fastener element 162 on the harness. The restraining strap 158 is also provided on its other end with a quick release strap clamp assembly 164 which may be of construction similar to that shown in FIGS. 7 and 8. The strap clamp assembly 164 allows the restraining strap 158 to be fastened quickly and securely to any point along the length of the strap 154. Thus the pet can be held close to one side or in the center of the truck cargo area.

Finally, it should be understood that in the various embodiments described above, the harness which fits around the animal may be in the form of a vest.

We claim:

1. A pet restraining apparatus for securely and safely restraining an animal in a vehicle, said apparatus comprising:
    a harness configured to be fitted around an animal to be restrained, said harness having secured thereto a first quick release fastener element; and
    a restraining strap, one end of said restraining strap having securely affixed thereto a second quick release fastener element in the shape of an insert portion which is lockable with the receptacle portion of a standard automobile seat belt buckle to form, therewith a first fastener assembly, the other end of said restraining strap having a third quick release fastener element which can be quickly and securely attached to said first quick release fastener element on said harness to form a second fastener assembly which is smaller than said first fastener assembly and which is sufficiently small and light so as not to be interfered with by or cause discomfort to, an animal in said harness; and
    a slide mechanism held to said restraining strap between said second and third quick release fastener elements, said restraining strap being looped through an opening in one of said second and third quick release fastener elements and extending back and held to said slide mechanism on said restraining strap for adjusting its length between said second and third quick release fastener elements.

2. A pet restraining apparatus according to claim 1, wherein said quick release fastener insert portion is in an elongated member and is connected to said restraining strap intermediate its ends.

3. A pet restraining apparatus according to claim 2 wherein said elongated member is formed with three closely spaced slots and wherein said one end of said restraining strap is woven back and forth through said slots.

4. A pet restraining apparatus according to claim 2, wherein the opposite ends of said elongated member have different widths to fit into different types of seat belt buckle receptacles.

5. A pet restraining apparatus according to claim 1 wherein said quick release fastener insert portion is an assembly of several insert portions secured to said other end of said restraining strap.

6. A pet restraining apparatus according to claim 5 wherein said several insert portions are held together in a common loop at said other end of said restraining strap.

7. A pet restraining apparatus according to claim 5, wherein said several insert portions are pivotedly mounted on common plate-like element which is secured to said other end of said restraining strap.

8. A pet restraining apparatus according to claim 1, wherein a sleeve fits over said quick release fastener insert portion to hold one end thereof back against the restraining strap with the other end projecting from the strap.

9. A pet restraining apparatus according to claim 1, wherein said first quick release fastener element on said harness is a receptacle portion of a quick release buckle.

10. A pet restraining apparatus according to claim 1, wherein said harness comprises forward and rearward loops which can be fitted, respectively, around the neck of an animal forwardly of its front legs and around the body of the animal rearwardly of its front legs, the lower portion of said forward loop extending down between the front legs of the animal and being connected via a lower connecting portion to the rearward loop, the upper portion of said forward loop being connected to the upper portion of said rearward loop via an upper connecting portion extending along the back of the animal.

11. A pet restraining apparatus according to claim 10, wherein said loops and connecting portions are formed from webbing material.

12. A pet restraining apparatus according to claim 10, wherein said rearward loop includes a quick release buckle which permits it to open for attaching the harness to an animal.

13. A pet restraining apparatus according to claim 10, wherein said rearward loop is adjustable in length.

14. A pet restraining apparatus according to claim 12, wherein said rearward loop is formed of webbing material and includes a slide element arranged to permit it to be adjusted in length.

15. A pet restraining apparatus according to claim 10, wherein a pair of releasable fastener elements are located on said harness where said upper connecting portion meets said rearward loop.

16. A pet restraining apparatus according to claim 10, wherein said first quick release fastener element is a portion of a quick release buckle.

17. A pet restraining apparatus according to claim 1, wherein said first quick release fastener element is the portion of a quick release buckle.

18. A pet restraining apparatus according to claim 15, wherein each of said pair of releasable fastener elements is the receptacle portion of a quick release buckle.

19. A pet restraining apparatus according to claim 10, wherein said forward loop is securely affixed to both said upper and lower connecting portions.

20. A pet restraining apparatus according to claim 15, wherein said rearward loop is movable along its length with respect to said upper connecting portion.

21. A pet restraining apparatus according to claim 16, wherein said upper connecting portion is formed with a subloop at the rear thereof to accommodate said rearward loop.

22. A pet restraining apparatus according to claim 21, wherein said subloop accommodates at least one releasable element for connection of said harness to another member.

23. A pet restraining apparatus according to claim 16, wherein said lower connecting portion is formed with a subloop at the rear thereof to accommodate said rearward loop.

24. A pet restraining apparatus according to claim 1, further including a leash having a quick release fastener portion on one end which is lockable with a mating quick release fastener on said harness.

25. A pet restraining apparatus according to claim 24, wherein the quick release fastener portion on said leash is the insert portion of a quick release fastener and the mating quick release fastener on said harness is the receptacle portion of a quick release fastener.

26. A pet restraining apparatus according to claim 24, wherein said leash is formed from webbing material.

27. A pet restraining apparatus according to claim 24, wherein said leash is adjustable in length.

28. A pet restraining apparatus according to claim 27, wherein said leash is formed from webbing material and includes a slide element arranged to permit length adjustment of said leash.

29. A pet restraining apparatus according to claim 1, wherein said harness is in the form of a collar which fits around the neck of an animal.

30. A pet restraining apparatus according to claim 1, wherein said second quick release fastener element is in the form of a snap hook.

31. A pet restraining apparatus for securely and safely restraining an animal in a vehicle and which is readily adaptable to accommodate different size animals, said apparatus comprising a harness configured to be fitted around an animal to be restrained, said harness having secured thereto a first quick release fastener element; and a restraining strap, one end of said restraining strap having securely affixed thereto a plurality of automobile seat belt buckle insert portions of different dimensions to fit, respectively, into the receptacle portions of different automobile seat belt buckles, said insert portions being selectively movable relative to said strap such that one insert portion projects from said strap while the remainder project back in a different direction, whereby the restraining strap is adaptable for use with different automobile seat belt systems, the other end of said restraining strap having a second quick release fastener element which can be quickly and securely attached to said first quick release fastener element on said harness, said plurality of automobile seat belt buckle insert portions being formed at opposite ends of an elongated member which is connected to said restraining strap intermediate its ends and the opposite ends of said elongated member having different widths to fit into different types of seat belt buckle receptacles.

32. A pet restraining apparatus according to claim 31, wherein said pet restraining apparatus includes an intermediate restraining strap extension having quick release fastener elements on each end thereof for connection, respectively, to said first and second quick release fastener elements.

33. A pet restraining apparatus according to claim 32, wherein said intermediate restraining strap section is adjustable in length.

34. A pet restraining apparatus according to claim 31, wherein said elongated member is formed with three closely spaced slots and wherein said other end of said restraining strap is woven back and forth through said slots.

35. A pet restraining apparatus according to claim 31, wherein a sleeve fits over said elongated member to hold one end thereof back against the restraining strap with the other end projecting from the strap.

36. A pet restraining apparatus according to claim 31, wherein said first quick release fastener element on said harness is a receptacle portion of a quick release buckle and wherein said second quick release fastener element on said restraining strap is an insert portion of a quick release buckle.

37. A pet restraining apparatus for securely and safely restraining an animal in a vehicle and which is readily adaptable to accommodate different size animals, said apparatus comprising a harness configured to be fitted around an animal to be restrained, said harness having secured thereto a first quick release fastener element; and a restraining strap, one end of said restraining strap having securely affixed thereto a plurality of automobile seat belt buckle insert portions of different dimensions to fit, respectively, into the receptacle portions of different automobile seat belt buckles, said insert portions being selectively movable relative to said strap such that one insert portion projects from said strap while the remainder project back in a different direction, whereby the restraining strap is adaptable for use with different automobile seat belt systems, the other end of said restraining strap having a second quick release fastener element which can be quickly and securely attached to said first quick release fastener element on said harness, said several insert portions being held together in a common loop at said other end of said restraining strap.

38. A pet restraining apparatus for securely and safely restraining an animal in a vehicle and which is readily adaptable to accommodate different size animals, said apparatus comprising a harness configured to be fitted around an animal to be restrained, said harness having secured thereto a first quick release fastener element; and a restraining strap, one end of said restraining strap having securely affixed thereto a plurality of automobile seat belt buckle insert portions of different dimensions to fit, respectively, into the receptacle portions of different automobile seat belt buckles, said insert portions being selectively movable relative to said strap such that one insert portion projects from said strap while the remainder project back in a different direction, whereby the restraining strap is adaptable for use with different automobile seat belt systems, the other end of said restraining strap having a second quick release fastener element which can be quickly and securely attached to said first quick release fastener element on said harness, said several insert portions being pivotally mounted on a common plate-like element which is secured to said other end of said restraining strap.

* * * * *

UNITED STATES PATENT AND TRADEMARK OFFICE
CERTIFICATE OF CORRECTION

PATENT NO. : 5,154,660

DATED : October 13, 1992

INVENTOR(S) : WILLIAM A. SNYDER ET AL.    Page 1 of 2

It is certified that error appears in the above-identified patent and that said Letters Patent is hereby corrected as shown below:    On the title page: Item

[56] REFERENCES CITED

U.S. Patent Documents,
"263,636" should read --D.263,636--;
"Lasey" should read --Losey--;
"Dishurt" should read --Dishart--;
"Laggerta" should read --Leggett--;
"Lucis" should read --Luce--; and
"Birchmann, III et al." should read
--Birchmire, III et al.--.

COLUMN 2

Line 16, "animals" should read --animal's--.

COLUMN 5

Line 50, "The" should read --¶ The--.

COLUMN 9

Line 22, "platelike" should read --plate-like--.

COLUMN 10

Line 61, "consistant" should read --consistent--.
Line 68, "well known" should read --well-known--.

UNITED STATES PATENT AND TRADEMARK OFFICE
CERTIFICATE OF CORRECTION

PATENT NO. : 5,154,66C
DATED : October 13, 1992
INVENTOR(S) : WILLIAM A. SNYDER ET AL.   Page 2 of 2

It is certified that error appears in the above-identified patent and that said Letters Patent is hereby corrected as shown below:

COLUMN 11

Line 32, "form," should read --form--.
    Line 50, "in" should be deleted.
    Line 53, "claim 2" should read --claim 2,--.
    Line 63, "claim 1" should read --claim 1,--.
    Line 67, "claim 5" should read --claim 5,--.

COLUMN 12

Line 5, "common" should read --a common--.
    Line 48, "the" should read --a--.

COLUMN 13

Line 24, "second" should read --third--.

COLUMN 14

Line 61, "pivotally" should read --pivotedly--.

Signed and Sealed this

Twenty-eighth Day of December, 1993

Attest:

BRUCE LEHMAN

Attesting Officer          Commissioner of Patents and Trademarks